US010118811B2

(12) United States Patent
Zhu et al.

(10) Patent No.: US 10,118,811 B2
(45) Date of Patent: Nov. 6, 2018

(54) ECCENTRIC LOADING ADJUSTING MECHANISM AND METHOD FOR PARALLEL SUSPENSION PLATFORM

(71) Applicant: CHINA UNIVERSITY OF MINING AND TECHNOLOGY, Xuzhou, Jiangsu (CN)

(72) Inventors: Zhencai Zhu, Jiangsu (CN); Guohua Cao, Jiangsu (CN); Naige Wang, Jiangsu (CN); Lu Yan, Jiangsu (CN); Lei Wei, Jiangsu (CN); Lei Wang, Jiangsu (CN); Weihong Peng, Jiangsu (CN); Wei Li, Jiangsu (CN); Gongbo Zhou, Jiangsu (CN); Yuxing Peng, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 22 days.

(21) Appl. No.: 15/539,175

(22) PCT Filed: Dec. 29, 2015

(86) PCT No.: PCT/CN2015/099314
§ 371 (c)(1),
(2) Date: Jun. 23, 2017

(87) PCT Pub. No.: WO2017/088251
PCT Pub. Date: Jun. 1, 2017

(65) Prior Publication Data

US 2018/0265339 A1 Sep. 20, 2018

(30) Foreign Application Priority Data

Nov. 27, 2015 (CN) .......................... 2015 1 0849358

(51) Int. Cl.
*F16M 11/00* (2006.01)
*B66F 11/04* (2006.01)
(Continued)

(52) U.S. Cl.
CPC ............ *B66F 11/044* (2013.01); *B66B 7/046* (2013.01); *B66B 17/12* (2013.01); *B66F 17/006* (2013.01); *B66F 2700/09* (2013.01)

(58) Field of Classification Search
CPC ..... B66F 17/006; B66F 17/042; F16M 11/10; F16M 2200/041
See application file for complete search history.

(56) References Cited

U.S. PATENT DOCUMENTS 4,103,783 A 8/1978 Beduhn et al.
9,415,986 B2 * 8/2016 Cummings ........... B66F 17/006
(Continued)

FOREIGN PATENT DOCUMENTS

CN 201354290 Y 12/2009
CN 201777828 U 3/2011
(Continued)

*Primary Examiner* — Amy J. Sterling
(74) *Attorney, Agent, or Firm* — Soroker Agmon Nordman PTE Ltd.

(57) ABSTRACT

An eccentric loading adjusting mechanism (5) and method for a parallel suspension platform. The adjusting mechanism (5) comprises a rotary platform (5-2) and a support guide frame (5-3) disposed on the rotary platform (5-2), wherein the base of the rotary platform (5-2) is fixedly connected to a suspension platform (4); a circular guide rail (5-8) is provided around the rotary platform (5-2); the support guide frame (5-3) is provided with two counterweight guide rails (5-15) and is connected to a rotary table of the rotary platform (5-2) by means of a rotary plate (5-17) on the support guide frame (5-3); and an electric drive pusher (5-6) drives a counterweight means (5-9) to move along the two
(Continued)

counterweight guide rails (5-15), thereby eliminating eccentric loading.

4 Claims, 2 Drawing Sheets

(51) Int. Cl.

| | |
|---|---|
| ***B66F 17/00*** | (2006.01) |
| ***B66B 7/04*** | (2006.01) |
| ***B66B 17/12*** | (2006.01) |

(56) References Cited

U.S. PATENT DOCUMENTS

| | | | | |
|---|---|---|---|---|
| 9,586,799 | B2 * | 3/2017 | Hao | B66F 17/006 |
| 9,656,845 | B2 * | 5/2017 | Dittus | B66F 11/044 |
| 9,790,069 | B2 * | 10/2017 | Davis | B66F 11/042 |

FOREIGN PATENT DOCUMENTS

| | | | |
|---|---|---|---|
| CN | 102661856 | A | 9/2012 |
| CN | 205328558 | U | 6/2016 |
| JP | 07069562 | A | 3/1995 |
| JP | 2006151578 | A | 6/2006 |

* cited by examiner

ECCENTRIC LOADING ADJUSTING MECHANISM AND METHOD FOR PARALLEL SUSPENSION PLATFORM

FIELD OF THE INVENTION

The present invention relates to an eccentric load adjusting mechanism, in particular to an eccentric load adjusting mechanism for a parallel-connected suspension platform and a method thereof.

BACKGROUND OF THE INVENTION

In the engineering application field, parallel-connected mechanisms in which a platform is suspended through four ropes exist widely, such as suspension platform winch systems for construction of shafts, suspension platform systems for construction in chimneys, and four-rope suspension systems for valuable space crafts in the aviation and aerospace field, etc. The main function of a parallel-connected rope suspension mechanism is to accomplish lifting of a suspension platform in the vertical direction, and to keep the suspension platform in a horizontal state and keep even tension distribution on the suspending steel wire ropes in the lifting process.

Owing to the fact that the four steel wire ropes are separately driven by four rope winding devices, the platform may tilt in the lifting process if the rotation speeds of the rope winding devices are unsynchronized or the centroid of the suspension platform becomes eccentric. However, most existing parallel-connected suspension platforms have no eccentric load adjusting mechanism. That problem brings a severe risk in operation stability and safety of such a parallel-connected suspension platform, and may even result in an overturn accident.

CONTENTS OF THE INVENTION

In view of the above-mentioned problem in the prior art, the present invention provides an eccentric load adjusting mechanism for a parallel-connected suspension platform and a method thereof. The eccentric load adjusting mechanism can make adjustment timely when the suspension platform tilts, so as to effectively eliminate a phenomenon of eccentric load of the suspension platform, and thereby effectively ensure operation stability and safety of the suspension platform; with the method, the suspension platform can be utilized safely and stably to do suspension work.

To attain the object described above, the eccentric load adjusting mechanism for a parallel-connected suspension platform provided in the present invention comprises a suspension platform, and an eccentric load adjusting mechanism is mounted on the suspension platform, the eccentric load adjusting mechanism comprises a rotary platform driven by a servo motor and a support and guide frame arranged on the rotary platform, the suspension platform is fixedly connected at its center to a base of the rotary platform, and a circular guide rail is arranged around the rotary platform and fixedly mounted on the suspension platform; the support and guide frame comprises two counterweight guide rails arranged in parallel to each other, a left angle steel piece and a right angle steel piece fixedly connected to the left ends and right ends of the counterweight guide rails respectively and arranged in parallel to each other, and a swivel plate arranged in parallel to the counterweight guide rails and fixedly connected to the middle parts of the left angle steel piece and right angle steel piece;

the support and guide frame is fixed via the swivel plate to a rotary disk of the rotary platform; the swivel plate is provided with rollers that fit with the guide rails at positions corresponding to the guide rails;

a push rod right support angle steel piece is fixedly connected to the left end of the left angle steel piece, a push rod left support angle steel piece is parallelly arranged at the left side of the push rod right support angle steel piece, the front and rear ends of the push rod left support angle steel piece and push rod right support angle steel piece are fixedly connected via a front angle steel piece and a rear angle steel piece arranged in parallel to each other;

a hinged base is fixedly connected above the push rod left support angle steel piece, a support base is fixedly connected above the push rod right support angle steel piece, the hinged base is hinged to the left end of an electric push rod, the support base is used for fixing the middle part of the electric push rod, a counterweight device is connected to the right end of the electric push rod, and the counterweight device can work with the two counterweight guide rails to move in an extending/retracting direction of the electric push rod.

Preferably, the counterweight device comprises a counterweight frame and counterweight blocks arranged on the counterweight frame, at least four counterweight wheels arranged around the bottom of the counterweight frame at positions corresponding to the two counterweight guide rails. Thus, the counterweight device can move smoothly, and thereby any eccentric load of the platform can be eliminated quickly.

Preferably, the suspension platform is circular, the rotary platform is arranged at the center of circle of the suspension platform, and the guide rail is arranged around the outer rim of the suspension platform.

In the present invention, the swivel plate is driven by the rotary platform to rotate and thereby the support and guide frame is driven to rotate, a counterweight device is arranged on the two counterweight guide rails on the support and guide frame in a way that the counterweight device can move in the length direction of the counterweight guide rails, the position of the counterweight device can be adjusted by means of the electric push rod, so that the counterweight device can be adjusted to different positions on the suspension platform, and thereby any eccentric load of the suspension platform can be adjusted effectively. Therefore, the mechanism can effectively eliminate a phenomenon of eccentric load of the suspension platform, and thereby ensures smoothness and safe operation of the suspension platform. The mechanism is simple in structure, safe and reliable, convenient to service, and especially applicable to adjustment of eccentric load of a parallel-connected suspension platform, and has high versatility.

An eccentric load adjusting method for a suspension platform, comprising the following steps:

step 1: arranging four rope winding devices in the same horizontal plane, wherein each of rope winding devices is wound with a steel wire rope respectively, connecting each of the four steel wire ropes via a tension sensor to the suspension platform respectively, and assembling an eccentric load adjusting mechanism on the suspension platform;

step 2: when an eccentric load of the suspension platform occurs, obtaining tension data with the tension sensors, performing tension analysis and ascertaining the magnitude and position of the eccentric load under a moment balance principle, and driving the rotary platform with the servo motor to rotate and thereby driving the support and guide frame to rotate to an angle corresponding to a direction opposite to the eccentric load, and then moving the counterweight device on the counterweight guide rails by a corresponding distance by the electric push rod, so as to eliminate the eccentric load of the platform.

In the present invention, the tensile data can be acquired in real time with the tension sensors connected to the steel wire ropes, and thereby tension analysis can be performed so that the magnitude and position of the eccentric load can be ascertained under a moment balance principle, and then the eccentric load can be adjusted by the eccentric load adjusting mechanism so as to eliminate the eccentric load of the platform. With the method, the suspension platform can operate safely and stably, and can operate normally in a harsher and more complex environment.

In the figures: 1—rope winding device; 2—steel wire rope; 3—tension sensor; 4—suspension platform; 5—eccentric load adjusting mechanism; 5-1—servo motor; 5-2—rotary platform; 5-3—support and guide frame; 5-4—support base; 5-5—hinged base; 5-6—electric push rod; 5-7—roller; 5-8—guide rail; 5-9—counterweight device; 5-10—rear angle steel piece; 5-11—push rod left support angle steel piece; 5-12—front angle steel piece; 5-13—push rod right support angle steel piece; 5-14—left angle steel piece; 5-15—counterweight guide rail; 5-16—right angle steel piece; 5-17—swivel plate; 5-18—counterweight block; 5-19—counterweight frame; 5-20—counterweight wheel.

DETAILED DESCRIPTION OF THE EMBODIMENTS

Hereunder the present invention will be detailed, with reference to the accompanying drawings.

Figure 1:
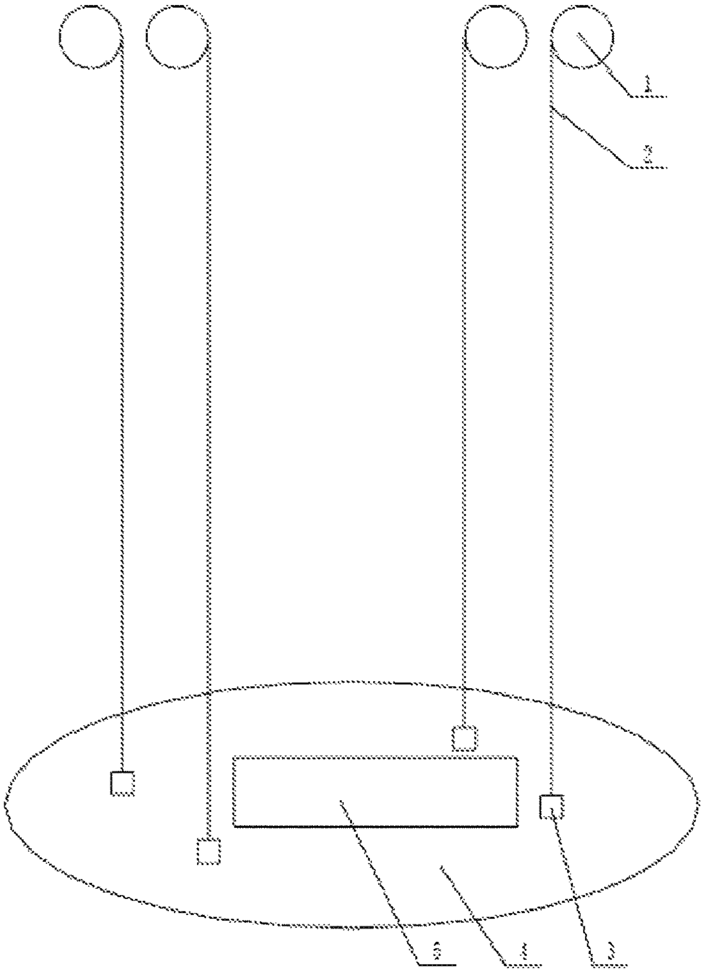
FIG. 1 is a schematic structural diagram of the parallel-connected suspension platform in operation according to the present invention.
Figure 2:
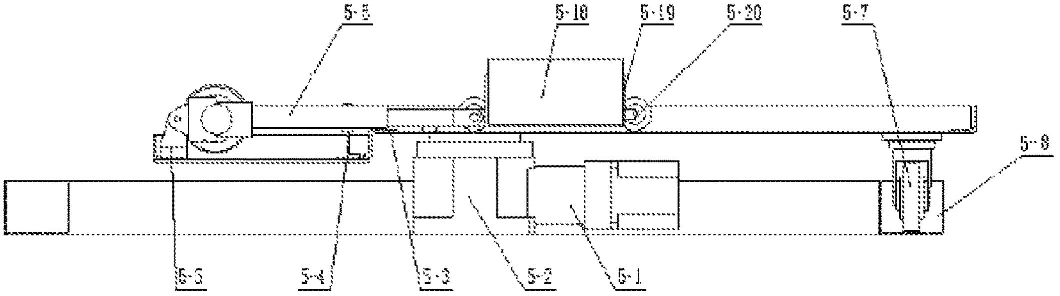
FIG. 2 is a schematic structural diagram according to the present invention.
Figure 3:
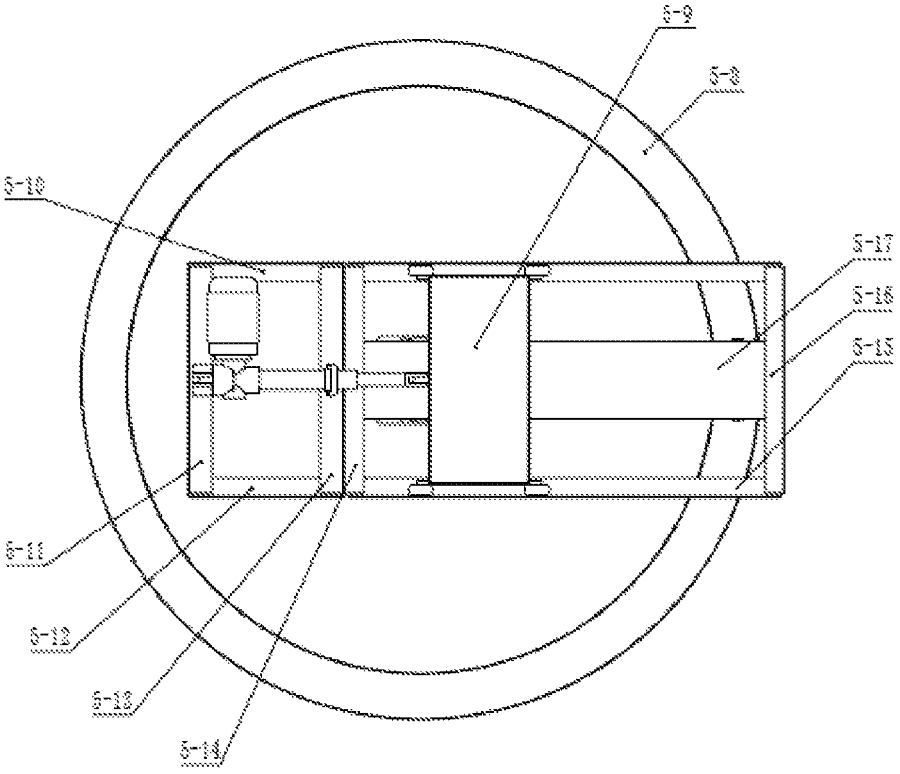
FIG. 3 is a top view of the structure shown in FIG. 2.

As shown in FIG. 1 to FIG. 3, the eccentric load adjusting mechanism for a parallel-connected suspension platform provided in the present invention comprises a suspension platform 4, an eccentric load adjusting mechanism 5 is mounted on the suspension platform 4, and the eccentric load adjusting mechanism 5 comprises a rotary platform 5-2 driven by a servo motor 5-1 and a support and guide frame 5-3 arranged on the rotary platform 5-2, the suspension platform 4 is fixedly connected at its center to a base of the rotary platform 5-2, and a circular guide rail 5-8 is arranged around the rotary platform 5-2 and fixedly mounted on the suspension platform 4; the support and guide frame 5-3 comprises two counterweight guide rails 5-15 arranged in parallel to each other, a left angle steel piece 5-14 and a right angle steel piece 5-16 fixedly connected to the left ends and right ends of the counterweight guide rails 5-15 respectively and arranged in parallel to each other, and a swivel plate 5-17 arranged in parallel to the counterweight guide rails 5-15 and fixedly connected to the middle parts of the left angle steel piece 5-14 and right angle steel piece 5-16; here, the rotary platform 5-2 is preferably a rotary platform of a right-angle output type.

The support and guide frame 5-3 is fixed via the swivel plate 5-17 to a rotary disk of the rotary platform 5-2; the swivel plate 5-17 is provided with rollers 5-7 that fit with the guide rails 5-8 at positions corresponding to the guide rails 5-8; the rollers 5-7 provides a support function for the support and guide frame 5-3.

A push rod right support angle steel piece 5-13 is fixedly connected to the left end of the left angle steel piece 5-14, a push rod left support angle steel piece 5-11 is parallelly arranged at the left side of the push rod right support angle steel piece 5-13, the front and rear ends of the push rod left support angle steel piece 5-11 and push rod right support angle steel piece 5-13 are fixedly connected via a front angle steel piece 5-12 and a rear angle steel piece 5-10 arranged in parallel to each other.

A hinged base 5-5 is fixedly connected above the push rod left support angle steel piece 5-11, a support base 5-4 is fixedly connected above the push rod right support angle steel piece 5-13, the hinged base 5-5 is hinged to the left end of an electric push rod 5-6, the support base 5-4 is used for fixing the middle part of the electric push rod 5-6, a counterweight device 5-9 is connected to the right end of the electric push rod 5-6, and the counterweight device 5-9 can work with the two counterweight guide rails 5-15 to move in an extending/retracting direction of the electric push rod 5-6.

The counterweight device 5-9 can be counterweight blocks. In the present invention, to reduce the friction of the counterweight device 5-9 against the counterweight guide rails 5-15, the counterweight device 5-9 comprises a counterweight frame 5-19 and counterweight blocks 5-18 arranged on the counterweight frame 5-19, at least four counterweight wheels 5-20 arranged around the bottom of the counterweight frame 5-19 at positions corresponding to the two counterweight guide rails 5-15. Thus, the counterweight device 5-9 can move smoothly, and thereby any eccentric load of the platform can be eliminated quickly.

The suspension platform 4 is a circular, also can be a square; circular shape is preferred in the present invention. The rotary platform 5-2 is arranged at the center of circle of the suspension platform 4, and the guide rail 5-8 is arranged around the outer rim of the suspension platform 4.

In actual application, the suspension platform 4 may be configured into a double-layer truss structure, wherein, the upper layer is used to bear persons and cargo, the eccentric load adjusting mechanism 5 is arranged on the lower layer. Of course, the suspension platform 4 may be configured into a hollow structure, with the eccentric load adjusting mechanism 5 disposed in a cavity in the suspension platform 4. Alternatively, the eccentric load adjusting mechanism 5 may be disposed on the top surface of the suspension platform 4, and then the suspension platform 4 is covered with a cover body, the top part of which is configured to bear cargo.

When an eccentric load of the suspension platform 4 occurs, the rotary platform 5-2 is driven by the servo motor 5-1 to rotate, and thereby the support and guide frame 5-3 is driven to move in a direction opposite to the eccentric load; then, the counterweight device 5-9 is driven to move in the length direction of the support and guide frame 5-3 as the electric push rod 5-6 extends/retracts, so that the eccentric load of the suspension platform 4 is eliminated.

An eccentric load adjusting method for a suspension platform, comprising the following steps:

step 1: arranging four rope winding devices 1 in the same horizontal plane, wherein each of rope winding devices 1 is wound with a steel wire rope 2 respectively, connecting each of the four steel wire ropes 2 via a tension sensor 3 to the suspension platform 4 respectively, and assembling the eccentric load adjusting mechanism 4 on the suspension platform 4;

step 2: when an eccentric load of the suspension platform 4 occurs, obtaining tension data by the tension sensors 3, performing tension analysis and ascertaining the magnitude and position of the eccentric load under a moment balance principle by means of a controller connected with the tension sensors 3, and controlling a servo motor 5-1 by the controller to drive the rotary platform 5-2 to rotate, and thereby driving the support and guide frame 5-3 to rotate to an angle corresponding to a direction opposite to the eccentric load, and then moving the counterweight device 5-9 on the counterweight guide rails 5-15 by a corresponding distance by the electric push rod 5-6, so as to eliminate the eccentric load of the platform.

With the method, the suspension platform can operate safely and stably, and can operate normally in a harsher and more complex environment.

We claim:

1. An eccentric load adjusting mechanism for a parallel-connected suspension platform, comprising a suspension platform (4), wherein, an eccentric load adjusting mechanism (5) is mounted on the suspension platform (4), and the eccentric load adjusting mechanism (5) comprises a rotary platform (5-2) driven by a servo motor (5-1) and a support and guide frame (5-3) arranged on the rotary platform (5-2), the suspension platform (4) is fixedly connected at its center to a base of the rotary platform (5-2), and a circular guide rail (5-8) is arranged around the rotary platform (5-2) and fixedly mounted on the suspension platform (4); a support and guide frame (5-3) comprises two counterweight guide rails (5-15) arranged in parallel to each other, a left angle steel piece (5-14) and a right angle steel piece (5-16) fixedly connected to left ends and right ends of the counterweight guide rails (5-15) respectively and arranged in parallel to each other, and a swivel plate (5-17) arranged in parallel to the counterweight guide rails (5-15) and fixedly connected to the middle parts of the left angle steel piece (5-14) and right angle steel piece (5-16);

the support and guide frame (5-3) is fixed via the swivel plate (5-17) to a rotary disk of the rotary platform (5-2); the swivel plate (5-17) is provided with rollers (5-7) that fit with the guide rails (5-8) at positions corresponding to the guide rails (5-8);

a push rod right support angle steel piece (5-13) is fixedly connected to the left end of the left angle steel piece (5-14), a push rod left support angle steel piece (5-11) is parallelly arranged at the left side of the right support angle steel piece for push rod (5-13), the front and rear ends of the push rod left support angle steel piece (5-11) and push rod right support angle steel piece (5-13) are fixedly connected via a front angle steel piece (5-12) and a rear angle steel piece (5-10) arranged in parallel to each other;

a hinged base (5-5) is fixedly connected above the push rod left support angle steel piece (5-11), a support base (5-4) is fixedly connected above the right support angle steel piece (5-13), the hinged base (5-5) is hinged to the left end of an electric push rod (5-6), the support base (5-4) is used for fixing the middle part of the electric push rod (5-6), a counterweight device (5-9) is connected to the right end of the electric push rod (5-6), and the counterweight device (5-9) can work with the two counterweight guide rails (5-15) to move in an extending/retracting direction of the electric push rod (5-6).

2. The eccentric load adjusting mechanism for a parallel-connected suspension platform according to claim 1, wherein, the counterweight device (5-9) comprises a counterweight frame (5-19) and counterweight blocks (5-18) arranged on the counterweight frame (5-19), at least four counterweight wheels (5-20) arranged around the bottom of the counterweight frame (5-19) at positions corresponding to the two counterweight guide rails (5-15).

3. The eccentric load adjusting mechanism for a parallel-connected suspension platform according to claim 1, wherein, the suspension platform (4) is circular, the rotary platform (5-2) is arranged at the center of circle of the suspension platform (4), and the guide rail (5-8) is arranged around the outer rim of the suspension platform (4).

4. An eccentric load adjusting method for a parallel-connected suspension platform, wherein, comprising the following steps:

step 1: arranging four rope winding devices (1) in the same horizontal plane, wherein each of rope winding devices (1) is wound with a steel wire rope (2) respectively, connecting each of the four steel wire ropes (2) via a tension sensor (3) to the suspension platform (4) respectively, and assembling the eccentric load adjusting mechanism (4) on the suspension platform (4);

step 2: when an eccentric load of the suspension platform (4) occurs, obtaining tension data with the tension sensors (3), performing tension analysis and ascertaining the magnitude and position of the eccentric load under a moment balance principle, and driving the rotary platform (5-2) with a servo motor (5-1) to rotate and thereby driving the support and guide frame (5-3) to rotate to an angle corresponding to a direction opposite to the eccentric load, and then moving the counterweight device (5-9) on the counterweight guide rails (5-15) by a corresponding distance by the electric push rod (5-6), so as to eliminate the eccentric load of the platform.

* * * * *